Dec. 6, 1955  H. T. FRANCIS  2,725,602
HINGED WALL OF FOLDING HOUSE TRAILER
Filed July 15, 1952  2 Sheets-Sheet 1
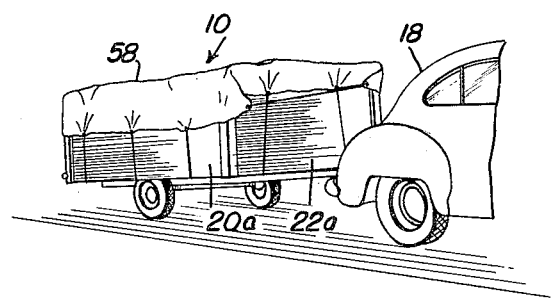
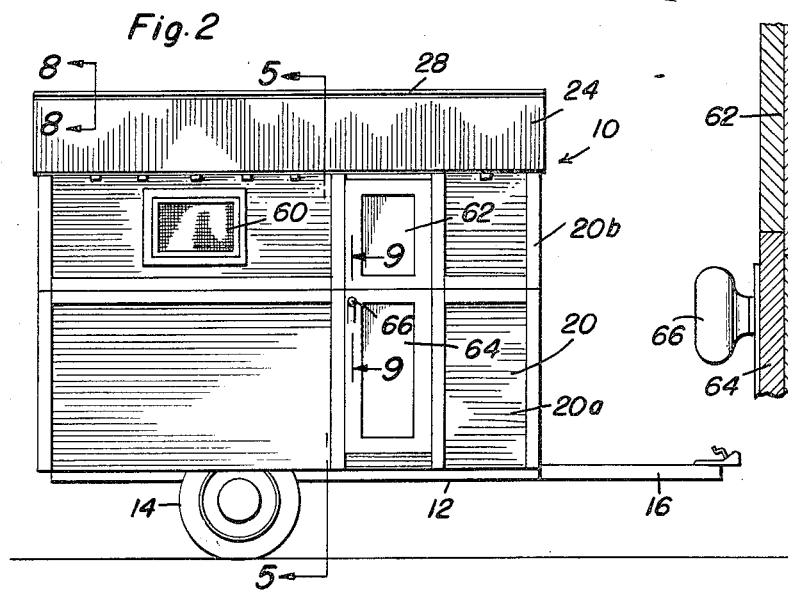
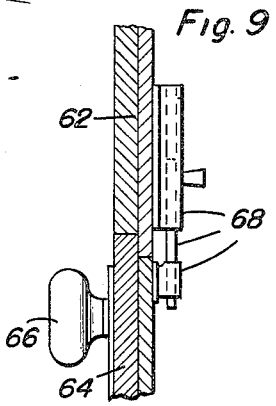
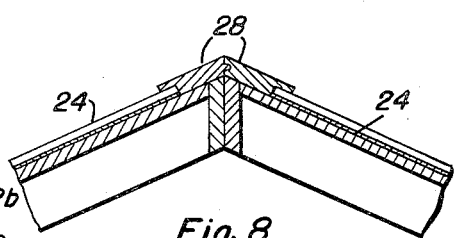
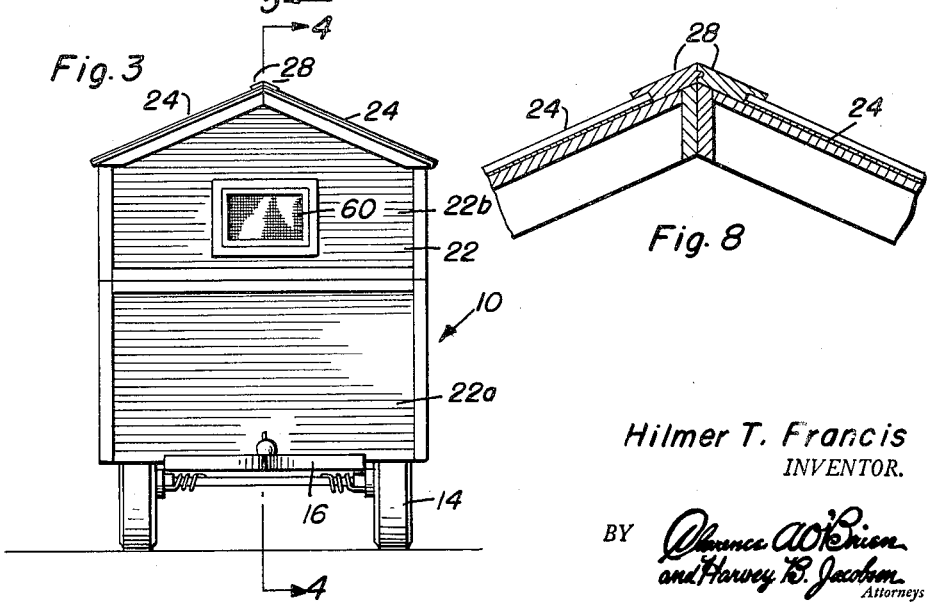
Hilmer T. Francis
INVENTOR.

Dec. 6, 1955   H. T. FRANCIS   2,725,602
HINGED WALL OF FOLDING HOUSE TRAILER
Filed July 15, 1952   2 Sheets-Sheet 2
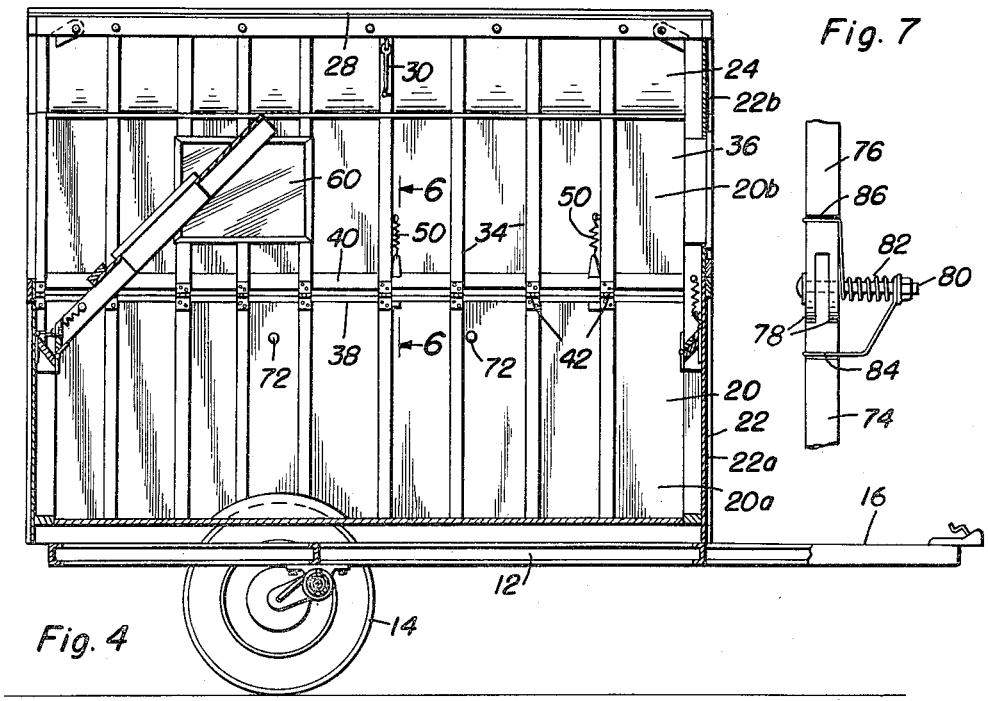
Hilmer T. Francis
INVENTOR.

United States Patent Office 2,725,602
Patented Dec. 6, 1955

2,725,602

HINGED WALL OF FOLDING HOUSE TRAILER

Hilmer T. Francis, International Falls, Minn., assignor of one-third to Vernon T. Francis and one-third to H. Theodore Francis, International Falls, Minn.

Application July 15, 1952, Serial No. 298,901

1 Claim. (Cl. 20—2)

This invention relates to new and useful improvements and structural refinements in trailers, particularly house trailers, and the principal object of the invention is to provide a trailer of the character herein described, which may be quickly and easily folded to a compact form for purposes of transportation.

Some of the advantages of the invention reside in its simplicity of construction, in its efficient operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a perspective view of the invention, illustrating the trailer being towed by an automobile.

Figure 2 is a side elevational view of the trailer per se in its erected condition.

Figure 3 is a front elevational view of the trailer.

Figure 4 is a vertical sectional view, taken substantially in the plane of the line 4—4 in Figure 3.

Figure 5 is a vertical sectional view, taken substantially in the plane of the line 5—5 in Figure 2, but illustrating the trailer in its partly folded position.

Figure 6 is a fragmentary sectional detail on an enlarged scale, taken substantially in the plane of the line 6—6 of Figure 4.

Figure 7 is a fragmentary elevational view of a hinge structure such as may be used in substitution for that shown in Figure 6.

Figure 8 is a fragmentary sectional view taken substantially in the plane of the line 8—8 in Figure 2, and Figure 9 is a fragmentary sectional view, taken substantially in the plane of the line 9—9 in Figure 2.

Like characters of reference are employed to designate like parts in the specification and throughout the several views.

Referring now to the accompanying drawings in detail, the invention consists of a folding trailer which is designated generally by the reference character 10 and embodies in its construction a chassis 12 provided with suitable wheels 14 and a hitch unit 16 for connection to a vehicle such as an automobile 18, as will be clearly understood.

The chassis 12 carries a house-like superstructure comprising a pair of side walls 20, a pair of end walls 22 and a pair of coacting roof sections 24, the roof sections being connected to upper edges of the side walls 20 by suitable hinges 26 and having interfitting tongue and groove ridge members 28 to prevent leakage.

Suitable hooks 30 may be provided at the upper edge of one roof section to engage suitable eyes 32 on the other roof section, whereby the entire roof may be sustained in an erected position, it being noted that the end walls 22 include gable portions on which the roof sections may rest, as is best shown in Figure 3.

Each of the walls 20, 22 comprises a lower section 20a, 22a, respectively and an upper section 20b, 22b respectively, and each wall section includes a frame 34 having a covering or "skin" of outer material 36 thereon. The frame 34 may assume the form of the usual "studs," and it will be noted that the upper ends of the studs of the lower sections are cut at a bevel and have secured thereto an abutment board 38 to abut a similar board 40 at the lower, beveled ends of the studs of the upper section, when the two sections are in vertical alignment as shown in Figure 6. Suitable hinges 42 are employed for connecting the upper and lower wall sections together, and resilient means, hereinafter described, are employed for urging the two wall sections into vertical alignment.

These means involve the provision of a hinge 44 which has one portion thereof secured to the inner surface of the covering 36 on the lower wall sections (see 46 in Figure 6), while the swingable portion 48 of the hinge has anchored thereto a tension spring 50 which is anchored to the frame of the upper wall sections as indicated at 52. Thus, when the upper wall section is folded inwardly about the hinges 42, the hinges 44 will be folded inwardly accordingly, and the springs 50 will become stretched, thus biasing the upper wall section toward its erected position. Needless to say, a plurality of the hinges 42, 44 and springs 50 are employed on each wall of the trailer, as will be readily appreciated.

As shown in Figure 5 the upper wall section is illustrated in its folded position by the dotted lines 54 while the associated roof section is shown in its folded position by the dotted lines 56.

One of the important features of the invention apart from the hinge structure already described resides in positioning the hinges 42 of the side walls 20 in a common, horizontal plane, while the similar or corresponding hinges of the end walls 22 are disposed in a horizontal plane which is spaced downwardly from the plane of the hinges of the side walls. By virtue of this arrangement the upper end wall sections 22b may be folded inwardly first and the upper side wall sections 20b and roof sections 24 may be folded or superposed on the folded end wall sections, as indicated in Figure 5.

However, it is to be observed that the outer covering or "skin" 36 of the lower end wall sections 22a extends above the associated hinges 42 to the horizontal plane of the hinges 42 on the side wall sections, so that when the trailer is in its folded position the upper edges thereof on all four sides are in a substantially common plane, so that the top of the trailer may be suitably covered, for example, by a tarpaulin 58, as shown in Figure 1.

Needless to say, the trailer may be provided with suitable windows 60 and with a door which is preferably formed from lower and upper sections at 62, 64 respectively, the lower door section having a conventional locking knob 66 while the upper door section is suitably interfitted into the lower section and is locked thereto by a suitable latch unit 68 (see Figure 9).

It will be also observed that the abutment boards 40 of the upper wall sections are provided with suitable recesses 70 to provide clearance for the hinges 44, particularly the movable portions 48 of the hinges, when the upper wall sections are folded inwardly.

Also, inwardly projecting pins 72 may be provided on the lower sections of the side walls 20 to provide stops or rests for the inwardly folded upper sections 22b of the end walls as is best shown in Figures 4 and 5.

If desired, the hinge structure 42, 44, may be substituted by a hinge arrangement such as shown in the accompanying Figure 7, wherein the studs 74, 76 of the respective lower and upper wall sections are formed with interfitting hinge ears 78 having a pin 80 extending therethrough, this pin also carrying a coil spring 82 having the respective end portions 84, 86 thereof in abutment or engagement with the studs 74, 76. In that manner the spring 82 will normally urge the wall sections to their erected positions as will be readily understood.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a folding trailer, a wall structure comprising a stud having a stationary lower section terminating in an inwardly bevelled upper end, an inwardly foldable upper section having a bevelled lower end in abutment with the upper end of the lower section when the wall upper and lower sections are in vertical alignment, a primary hinge secured to inner edges of the upper and lower stud sections, outside covering providing on outer edges of said stud sections, a secondary hinge having a lower portion secured to the inner surface of the covering on the outer edge of the lower stud section, said secondary hinge having an upper portion and a joint disposed above the axis of the primary hinge to facilitate folding the upper stud section, and a spring connected at one end to said upper portion of the secondary hinge and at its other end to the upper stud section above the upper portion of said secondary hinge, whereby to urge said sections into vertical alignment, the covering on the outer edge of the upper stud section being disposed outwardly of said upper portion of the secondary hinge and outwardly of said spring to cover the same when said upper stud section is folded and vertically aligned with the lower stud section.

References Cited in the file of this patent

UNITED STATES PATENTS

| | | |
|---|---|---|
| 1,071,730 | Garland | Sept. 2, 1913 |
| 1,276,941 | Mansager | Aug. 27, 1918 |
| 2,202,747 | Roloson | May 28, 1940 |
| 2,539,151 | Mills | Jan. 23, 1951 |
| 2,582,635 | Kipple | Jan. 15, 1952 |
| 2,589,416 | Miller | Mar. 18, 1952 |

FOREIGN PATENTS

| | | |
|---|---|---|
| 418,915 | Great Britain | Nov. 2, 1934 |
| 836,168 | France | Oct. 10, 1938 |